(No Model.)

J. A. HAHN.
CULTIVATOR.

No. 313,589. Patented Mar. 10, 1885.

Witnesses:

Inventor

UNITED STATES PATENT OFFICE.

JOHN A. HAHN, OF MOSCOW, IOWA.

CULTIVATOR.

SPECIFICATION forming part of Letters Patent No. 313,589, dated March 10, 1885.

Application filed September 15, 1884. (No model.)

*To all whom it may concern:*

Be it known that I, JOHN A. HAHN, of Moscow, in the county of Muscatine and State of Iowa, and a citizen of the United States of America, have invented a new and useful Improvement in Cultivators, of which the following is a specification, reference being had to the accompanying drawings, forming part of the same, in which—

Figure 1:
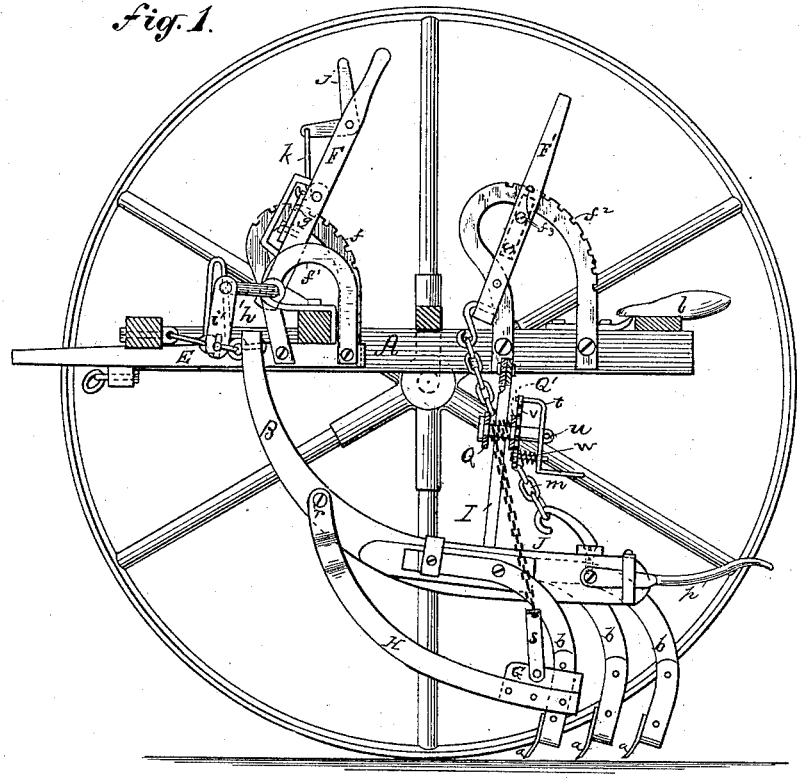
Figure 2:
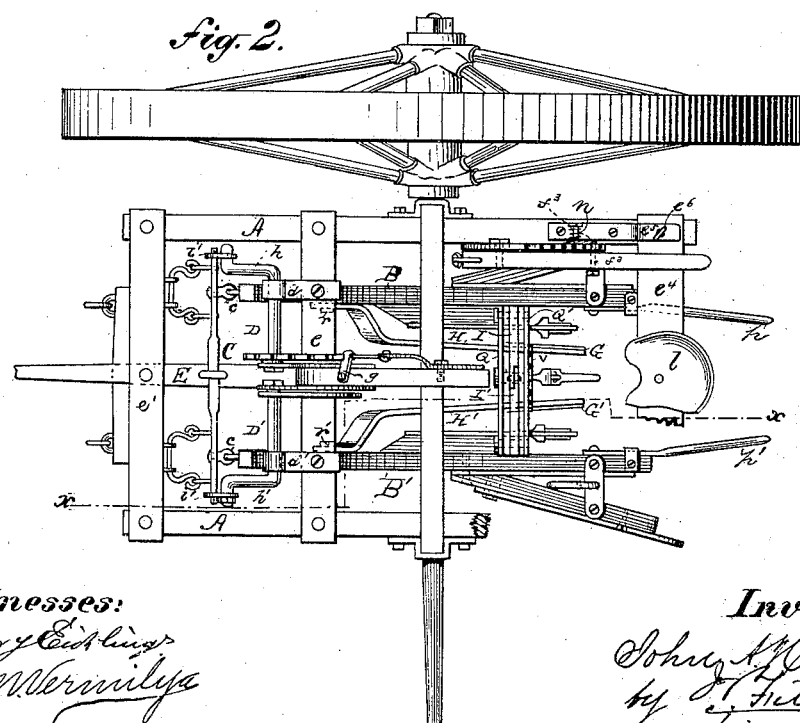

Figure 1 is a vertical section of a cultivator containing my invention, taken on line $x\ x$, Fig. 2, and Fig. 2 is a plan of said cultivator.

My invention relates to a cultivator mounted on wheels to be drawn by a horse; and it consists in the devices herein described and claimed, whereby, first, the forward end of the share-frame is raised and lowered, and, second, the position of the fenders herein described is adjusted to the position of the shares and to the height of the corn.

A is a frame, mounted on the usual running-gear, from which frame are suspended the working parts of the cultivator.

B B' are the share-beams—one arranged on each side of said frame, and which carry the shares $a$, secured on the ends of arms $b$, Fig. 1. A less or a larger number of shares may be used. The share-beams are curved, as shown in Fig. 1, and their forward ends are shackled to a drag-bar, C, which is itself shackled to the cross-bar $e'$ of the frame A. The middle portion of this bar is curved upward to allow its ends to drop below the draft-pole E.

D and D' are crank-shafts, journaled at their outer ends in bearings $d\ d'$, supported on a cross-bar, $e$, of frame A, the inner ends of said shafts being journaled severally in the arched supports $f\ f'$, that are bolted to the rear end of the draft-pole E.

$h$ and $h'$ are cranks on the outer ends, respectively, of said shafts $f\ f'$, which cranks are connected by link-bars $i\ i'$ to the drag-bar C.

F is a lever, forked at its lower end into two branches, which are respectively secured rigidly to the inner ends of the shafts D D'. If preferred, a single shaft may be used having a crank on each end, in which case one of the supports, $f$, may be dispensed with, and the lever F may be an unforked bar secured at its lower end to such single shaft at or near its longitudinal center. The arched support $f$ is provided on its outer edge with notches, as seen plainly in Fig. 1, and a dog or detent, $g$, pivoted on the lever F, engages these notches and holds the said lever F in any desired position. $j$ is a bell-crank lever, pivoted also on the lever F, and connected by a rod, $k$, to the dog $g$, whereby the said dog may be made to engage the notches on support $f$, and be disengaged therefrom at pleasure by the operator of the machine, both the lever F and the bell-crank lever $j$ being within reach of the operator when seated on the seat $l$, mounted on the rear of the frame A.

By these devices, constructed and arranged as above described, the forward ends of the share-beams B are made vertically adjustable. When the shafts $f\ f'$ are rocked by the movement of the lever F toward the rear of the machine, the drag-bar C is lifted upward by means of the cranks $i\ i'$, carrying with them the ends of the said share-beams shackled to said bar, the reverse movement of said lever allowing the said ends to drop downward.

The rear ends of the share-beams are severally suspended from the frame A by means of a chain, $m$, secured at its lower end to the beam and at its upper end to a lever, F', pivoted in an arched support, $f^2$, provided with notches, with which a stop-pin, $f^3$, fixed in said lever may engage, such engagement taking place when the lever is in contact with the side of the said support, the lever being pressed against the support by means of a spring, $n$, the lower end of which is secured to said lever, the opposite end lying on the side of said support opposite to said lever, the support thus being between the lever and spring. The stop is disengaged by springing the lever on its pivot away from the support $f^2$. By means of this lever arrangement the share-beams and shares may be raised or lowered at pleasure and held in any desired position, thus regulating the depth of tilth. $p\ p'$ are handles secured to the rear ends of the share-beams, by means of which the cultivator may be guided by the workman when walking behind the machine. The share-beams are adjustably tied together at their rear ends by an arch formed of two standards or posts, I I', which are secured to and rise from the said beams, their upper ends being bent over toward each other and lapping to form an arch. These posts are adjustably tied together at the base of the said arch by cross-bars Q Q', arranged one on each side of the posts, with screw-bolts passing through both the posts and the said bars, the bolt-holes in the bars being slotted to permit the share-beams to be adjusted nearer to or farther from each other, as may be desired.

G G' are the fenders, the office of which is to protect the corn from being covered up by the earth thrown over toward it by the two inner shares, which are designed to run one on one side and the other on the other side of a row of corn. These fenders are secured to the rear ends of arms H H', the forward ends of which are pivoted to the inner faces of the share-beams B B' at $r$ $r'$. These fenders are suspended from a small windlass, $u$, by a chain, J, wound thereon and attached at its lower end to a cross-bar, $s$, (preferably arched upward, so as not to interfere with the corn over which the cultivator passes,) which is secured to and ties together the said fenders.

The windlass on which is wound the chain J is journaled in the cross-bars Q Q', which are secured, one on the front side and the other on the rear side of the posts I I', which rise from the share-beams, leaving a space between them that is occupied by the said chain wound on the windlass.

On the outer face of the rear cross-bar, Q, is fixed a notched disk, $v$, the rear end of the axle of the windlass passing through the center of said disk. On this end of the said axle is a crank-arm, $t$, for turning the windlass. The end of said crank-arm opposite the handle is extended and bent over toward the notched disk and the extremity fitted to engage the notches in the disk. The hole in the crank-arm through which the end of the axle of the windlass passes is slotted, so as to permit the said arm to have a rocking motion on the axle, whereby its described bent end may engage and be disengaged from the notches in $v$, the engagement being effected by a spring, $w$, carried on a pin projecting from the handle end of said crank-arm inward toward the side of the disk $v$, against which the inner end of the said spring reacts. The said arm is disengaged from the notched wheel by rocking the crank-arm on its seat on the axle of the windlass against the stress of the spring $w$.

By means of the described devices the described fenders may be raised or lowered by the operator and held at any height to adjust them to the height of the plant or the depth of tilth of the shares, as described, independent of the share-beams and shares. This described arrangement enables the workman readily to vertically adjust the fenders G G' to the height of the corn or the depth of the tilth by the shares, and the adjustment of the plow-beams enables one to so adjust the same as to secure an even horizontal draft even with horses of different sizes. The seat $l$ is supported on a cross-bar, $e^4$, which is pivoted at one end to one of the side rails of the frame A, so that it may swing thereon, the opposite end being detachably secured in place by a bracket, $e^5$, secured to the rail, and a pin, $e^6$, which passes through holes in the bracket, cross-bar, and side rail. This arrangement permits the seat and cross-bar to be swung out of the way for the greater convenience of the workman when walking behind the cultivator and guiding the shares by means of the plow-handles.

What I claim as my invention, and desire to secure by Letters Patent, is—

1. The combination of the share-beams B B', the drag-bar C, shackled to said beams and to cross-bar $e'$, and cranks $h h'$, connected to the said drag-bar and provided with lever F, for actuating the said cranks, as and for the purpose described.

2. The combination of the share-beams B B', the drag-bar C, shackled thereto and to the frame A, the cranks $h h'$, connected to said drag-bar, the lever F, connected to said cranks, the notched support $f$, the dog $g$, and the connected bell-crank lever $j$, pivoted in the lever F, all as and for the purpose described.

3. The combination, with the fenders G G', pivoted to the share-beams B B', of the windlass $u$, journaled on cross-bars Q Q', the chain J, a notched disk, $v$, attached to the cross-bar Q, the crank-arm $t$, fitted loosely on the axle of said windlass and provided with an arm fitted to engage the notches on said disk, and a spring, $w$, adapted to effect such engagement, all as and for the purpose described.

JOHN A. HAHN.

Witnesses:
JOHN WALLACE,
MEL. ROST.